United States Patent
Chen et al.

(10) Patent No.: US 9,515,573 B2
(45) Date of Patent: Dec. 6, 2016

(54) CONVERTING APPARATUS AND CONTROL METHOD THEREOF

(71) Applicant: FSP TECHNOLOGY INC., Taoyuan (TW)

(72) Inventors: Han-Wei Chen, Taoyuan (TW); Chun-Hao Yu, Taoyuan (TW); Chia-Hua Liu, Taoyuan (TW)

(73) Assignee: FSP TECHNOLOGY INC., Taoyuan (TW)

(*) Notice: Subject to any disclaimer, the term of this patent is extended or adjusted under 35 U.S.C. 154(b) by 0 days.

(21) Appl. No.: 14/631,848

(22) Filed: Feb. 26, 2015

(65) Prior Publication Data

US 2015/0244256 A1 Aug. 27, 2015

Related U.S. Application Data

(60) Provisional application No. 61/944,587, filed on Feb. 26, 2014.

(30) Foreign Application Priority Data

Jan. 27, 2015 (CN) .......................... 2015 1 0039793

(51) Int. Cl.
*H02M 1/42* (2007.01)
*H02M 7/48* (2007.01)
*H02M 3/335* (2006.01)

(52) U.S. Cl.
CPC ............. *H02M 7/48* (2013.01); *H02M 1/4266* (2013.01); *H02M 3/33507* (2013.01); *H02M 3/33523* (2013.01); *Y02B 70/123* (2013.01)

(58) Field of Classification Search
USPC ...... 363/95, 97, 98, 131, 132, 32–37, 42–55
See application file for complete search history.

(56) References Cited

U.S. PATENT DOCUMENTS

| | | | |
|---|---|---|---|
| 2006/0256586 A1* | 11/2006 | Ohshima | H02M 7/53871 363/16 |
| 2007/0030708 A1* | 2/2007 | Wei | H02M 1/12 363/44 |
| 2009/0251938 A1* | 10/2009 | Hallak | H02M 7/4807 363/132 |
| 2010/0110743 A1* | 5/2010 | Yamasaki | H02M 7/53873 363/132 |

* cited by examiner

*Primary Examiner* — Timothy J Dole
*Assistant Examiner* — Bryan R Perez
(74) *Attorney, Agent, or Firm* — Jianq Chyun IP Office

(57) ABSTRACT

An inverting apparatus and a control method thereof are provided. The inverting apparatus includes an inverting circuit, a capacitor, and a control circuit. The inverting circuit receives a DC input power and is configured to convert the DC input power into an AC output power, wherein an AC output current of the AC output power is preset to a preset output current. The capacitor is connected to an output terminal of the inverting circuit. The control circuit is coupled to the inverting circuit and is configured to control a power conversion of the inverting circuit, wherein the control circuit superimposes a preset capacitor compensation current of which the phase leads to the preset output current on the preset output current, so as to control the inverting circuit to adjust the AC output current and provide the adjusted AC output current to a power grid.

9 Claims, 3 Drawing Sheets

CONVERTING APPARATUS AND CONTROL METHOD THEREOF

CROSS-REFERENCE TO RELATED APPLICATION

This application claims the priority benefits of U.S. provisional application Ser. No. 61/944,587, filed on Feb. 26, 2014 and China application serial no. 201510039793.2, filed on Jan. 27, 2015. The entirety of each of the above-mentioned patent applications is hereby incorporated by reference herein and made a part of this specification.

BACKGROUND OF THE INVENTION

Field of the Invention

The invention relates to a power conversion technique, and more particularly, to an inverting apparatus and a control method thereof.

Description of Related Art

A typical inverting apparatus is applied in a photovoltaic grid system, and an electromagnetic interference (EMI) filter circuit is disposed at the back-end of the inverting apparatus and connected to a power grid. After using a DC-to-AC inverting apparatus to convert the DC power of a photovoltaic device to an AC power, the photovoltaic grid system outputs an AC current to the EMI filter circuit for filtering and then providing to the power grid.

The EMI filter circuit is generally provided with a safety capacitor (i.e., an X capacitor) to perform filtering. Although the safety capacitor can filter and remove high-frequency EMI, it may also cause a portion of the AC current outputted by the inverting apparatus to be consumed by the safety capacitor at the same time (i.e., imaginary current of safety capacitor). As a result, the amplitudes/phases of the AC current received by the power grid and the AC current outputted by the inverting apparatus do not match, thus reducing the power factor of the inverting apparatus.

SUMMARY OF THE INVENTION

The invention provides an inverting apparatus and a control method thereof capable of compensating current consumption (virtual work) caused by a safety capacitor, and thereby increase the power factor of the inverting apparatus.

An inverting apparatus of the invention includes an inverting circuit, a capacitor, and a control circuit; the inverting circuit receives a DC input power and is configured to convert the DC input power into an AC output power, wherein an AC output current of the AC output power is preset to a preset output current; the capacitor is connected to the output terminal of the inverting circuit; the control circuit is coupled to the inverting circuit and is configured to control the power conversion of the inverting circuit; the control circuit superimposes a preset capacitor compensation current of which the phase leads to the preset output current on the preset output current for controlling the inverting circuit to adjust the AC output current, and providing the adjusted AC output current to a power grid.

In an embodiment of the invention, the preset capacitor compensation current is decided according to the operating frequency of the inverting circuit and the capacitance value of the capacitor.

In an embodiment of the invention, the phase of the preset capacitor compensation current substantially leads to the preset output current by 90 degrees, and substantially has the same amplitude as a current flowing through the capacitor.

In an embodiment of the invention, the AC output current received by the power grid is substantially equal to the preset output current.

In an embodiment of the invention, the control circuit includes a first signal generator, a second signal generator, an adder, and a controller. The first signal generator is configured to store a first lookup table corresponding to a phase characteristic of the preset output current, and generates a first current signal indicating the preset output current according to the first lookup table. The second signal generator is configured to store a second lookup table corresponding to a phase characteristic of the preset capacitor compensation current and a current command indicating an amplitude intensity of the preset capacitor compensation current, and generates a second current signal indicating the preset capacitor compensation current according to the second lookup table and the current command. The adder receives the first current signal and the second current signal to generate a reference current indicating the superimposition of the preset output current and the preset capacitor compensation current. The controller is coupled to the adder and the inverting circuit and samples the AC output current. The controller compares the AC output current and the reference current to generate a corresponding control signal to control the switching duty cycle of the inverting circuit so as to adjust the waveform of the AC output current to the waveform of the reference current.

A control method of an inverting apparatus of the invention includes the following steps: a DC input power is received; the DC input power is converted into an AC output power, wherein an AC output current of the AC output power is preset to a preset output current; the adjusted AC output current is provided to a power grid.

In an embodiment of the invention, the step of superimposing the preset capacitor compensation current of which the phase leads to the preset output current on the preset output current by the control circuit for controlling the inverting circuit to adjust the AC output current includes: a first current signal indicating the preset output current is generated according to a first lookup table, wherein the first lookup table indicates a phase characteristic of the preset output current; a second current signal indicating the preset capacitor compensation current is generated according to a second lookup table and a current command, wherein the second lookup table indicates a phase characteristic of the preset capacitor compensation current and the current command indicates the amplitude intensity of the preset capacitor compensation current; and a reference current indicating the superimposition of the preset output current and the preset capacitor compensation current is generated according to the first current signal and the second current signal.

In an embodiment of the invention, the step of superimposing the preset capacitor compensation current of which the phase leads to the preset output current on the preset output current by the control circuit so as to control the inverting circuit to adjust the AC output current further includes: an AC output current and the reference current are compared to accordingly generate a control signal; and the switching duty cycle of the inverting circuit is controlled by the control signal so as to control the inverting circuit to adjust the waveform of the AC output current to the waveform of the reference current.

Based on the above, the embodiments of the invention provide an inverting apparatus and a control method thereof. The inverting apparatus can provide an AC output current containing a preset output current component and a preset capacitor compensation current component to a back-end power grid, wherein the preset capacitor compensation current can be configured to compensate the imaginary current of a safety capacitor, such that the AC output current actually received by the power grid can be substantially equivalent to the preset output current, thus increasing the power factor of the inverting circuit.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
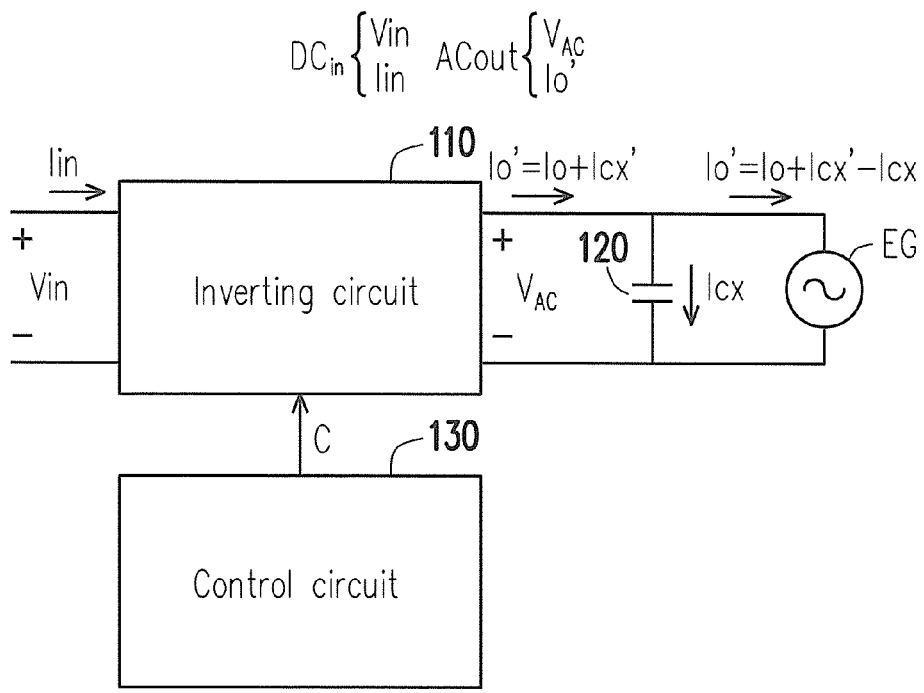
FIG. 1 is a schematic of the structure of an inverting apparatus of an embodiment of the invention.

To make the contents of the invention more easily understood, embodiments are provided below as examples of the plausibility of implementation of the invention. Moreover, when applicable, devices/components/steps having the same reference numerals in figures and embodiments represent the same or similar parts.

FIG. 1 is a schematic of the structure of an inverting apparatus of an embodiment of the invention. Referring to FIG. 1, an inverting apparatus 100 of the present embodiment can be applied in a photovoltaic grid system (not shown). The inverting apparatus 100 can receive a DC input power DCin (contains a DC input voltage Vin and a DC input current Iin) from a front-end photovoltaic device (not shown), and converts the received DC input power DCin into an AC output power ACout (contains an AC output voltage $V_{AC}$ and an AC output current Io') to a back-end power grid EG.

Specifically, the inverting apparatus 100 includes an inverting circuit 110, a capacitor 120, and a control circuit 130. The inverting circuit 110 receives the DC input power DCin and is configured to convert the DC input power DCin into the AC output power ACout. In particular, the circuit configuration of the inverting circuit 110 can be, for instance, half-bridge asymmetric, half-bridge symmetric, full-bridge, or other possible inverting circuit configurations, and the invention does not particularly limit the circuit configuration of the inverting circuit 110. Moreover, the capacitor 120 of the present embodiment can be a safety capacitor (such as an X capacitor) or other types of capacitors.

The capacitor 120 is connected to the output terminal of the inverting apparatus 100 and can be configured as a high-frequency discharge path so as to filter and remove noise that may be present in the AC output power ACout. The control circuit 130 is coupled to the inverting circuit 110 and is configured to control the power conversion of the inverting circuit 110, and a control signal C generated by the control circuit 130 can be, for instance, a PWM signal for controlling the switching of the inverting circuit 110, but the invention is not limited thereto.

Specifically, during the inverting circuit 110 performs power conversion, the control circuit 130 generates the control signal C to control the switching duty cycle of the inverting circuit 110 to control the magnitude of the AC output current Io' of the AC output power ACout generated by the inverting circuit 110. In the present embodiment, the control circuit 130 superimposes the preset capacitor compensation current Icx' of which the phase leads to the preset output current Io on the preset output current Io by modulating the control signal C, so as to control the inverting circuit 110 to adjust the AC output current Io', and provide the adjusted AC output current Io' to the back-end power grid EG. In particular, the adjusted AC output current Io' can be as shown in formula (1):

$$Io'=Io+Icx' \qquad (1)$$

In the present embodiment, the magnitude of the preset capacitor compensation current Icx' superimposed on the preset output current Io is decided according to the operating frequency of the inverting circuit 110 and the capacitance value of the capacitor 120. In other words, a designer can calculate the amplitude of a imaginary current Icx flowing through the capacitor 120 according to the operating frequency of the inverting circuit 110 and the capacitance value of the capacitor 120 in advance, and then set a corresponding control signal C according to the imaginary current Icx so as to superimpose the preset capacitor compensation current Icx' corresponding to the imaginary current Icx on the preset output current Io of the inverting circuit 110.

Figure 2:
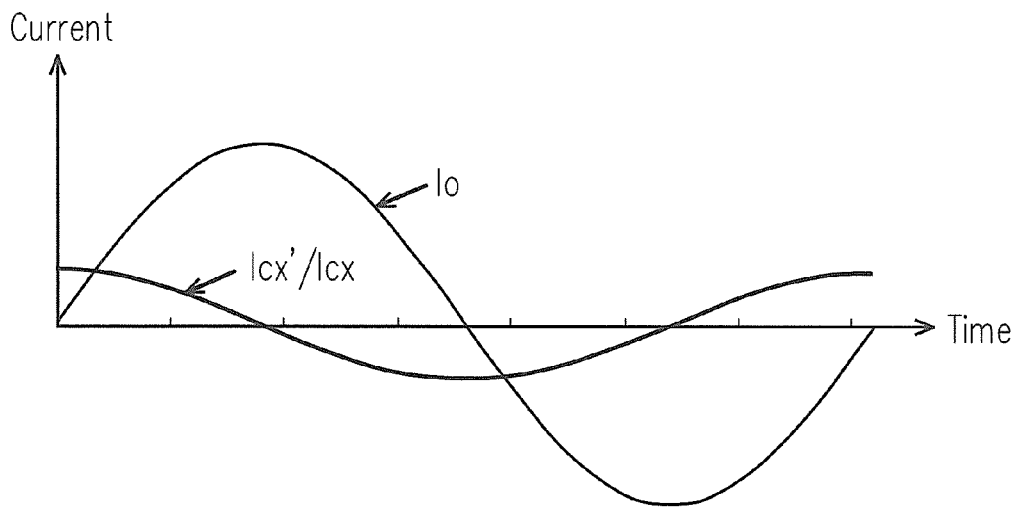
FIG. 2 is a current waveform of an AC output current of an embodiment of the invention.

More specifically, the waveforms of the preset output current Io and the preset capacitor compensation current Icx' can be as shown in FIG. 2 (FIG. 2 is a current waveform of the AC output current of an embodiment of the invention). In particular, the preset output current Io and the preset capacitor compensation current Icx' respectively has a sinusoidal form. Moreover, the calculated preset capacitor compensation current Icx' is designed to have the same phase and amplitude as the imaginary current Icx flowing through the capacitor 120. In other words, the phase of the preset capacitor compensation current Icx' substantially leads to the preset output current Io by about 90 degrees.

An AC output current Io' containing a preset output current Io component and a preset capacitor compensation current Icx' component is provided, where the preset capacitor compensation current Icx' can be configured to compensate the imaginary current Icx of the capacitor 120, such that the AC output current Io' actually received by the power grid EG can be substantially equivalent to the preset output current Io, thus increasing the power factor of the inverting circuit 110. In particular, the AC output current Io' actually received by the power grid EG can be as shown in formula (2):

$$Io'=Io+Icx'-Icx \qquad (2)$$

To more specifically describe how the control circuit 130 controls the inverting circuit 110 to generate the AC output current Io' containing the preset output current Io component and the preset capacitor compensation current Icx' component, specific embodiments are provided below with reference to FIG. 3. In particular, FIG. 3 is a schematic of the structure of a control circuit of an embodiment of the invention.

Figure 3:
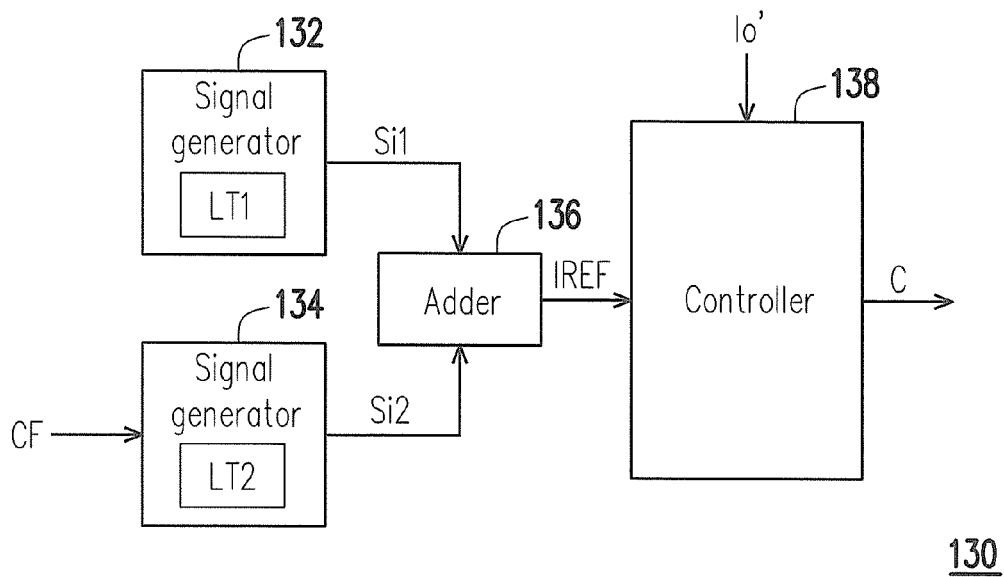
FIG. 3 is a schematic of the structure of a control circuit of an embodiment of the invention.

Referring to FIG. 3, in the present embodiment, the control circuit 130 includes signal generators 132 and 134, an adder 136, and a controller 138. The signal generator 132 is configured to store a lookup table LT1 corresponding to a phase characteristic of the preset output current Io, and the signal generator 134 is configured to store a lookup table LT2 corresponding to a phase characteristic of the preset capacitor compensation current Icx' and a current command CF. In particular, the lookup table LT1 can contain, for instance, magnitude information of the preset output current Io at different time points, and the lookup table LT2 can contain, for instance, unit current magnitude information of the preset capacitor compensation current Icx' at different time points. The current command CF indicates the amplitude intensity of the preset capacitor compensation current Icx', and can be set according to the operating frequency of the inverting circuit 110 and the capacitance value of the capacitor 120.

In the present embodiment, the signal generator 132 generates a current signal Si1 indicating the preset output current Io according to the lookup table LT1, and the signal generator 134 generates a current signal Si2 indicating the preset capacitor compensation current Icx' according to the lookup table LT2 and the current command CF.

The adder 136 is coupled to the signal generators 132 and 134, and is configured to receive the current signals Si1 and Si2 generated respectively by the signal generators 132 and 134 to superimpose the preset output current Io and the preset capacitor compensation current Icx' and generate a reference current IREF indicating the superimposition of the preset output current Io and the preset capacitor compensation current Icx'.

The controller 138 is coupled to the adder 136 and the output terminal of the inverting circuit 110 to receive the reference current IREF and sample the AC output current Io'. In particular, the controller 138 compares the AC output current Io' and the reference current IREF to generate a corresponding control signal C to control the switching duty cycle of the inverting circuit 110 so as to adjust the waveform of the AC output current Io' to the waveform of the reference current IREF.

Figure 4:
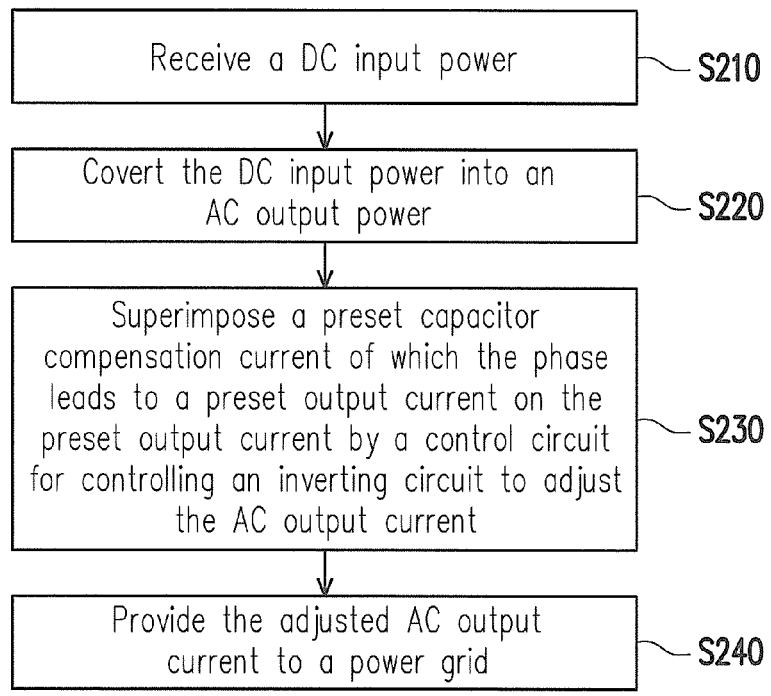
FIG. 4 is a flowchart of a control method of an inverting apparatus of an embodiment of the invention.

FIG. 4 is a flowchart of a control method of an inverting apparatus of an embodiment of the invention. The control method can be applied in the inverting apparatus 100 and the control circuit 130 as shown in FIG. 1 or FIG. 3 (but is not limited thereto). The control method includes the following steps: first, the inverting circuit 110 receives the DC input power DCin (step S210); the DC input power DCin is converted into the AC output power ACout by the inverting circuit 110, wherein the AC output current Io' of the AC output power ACout is preset to the preset output current Io (step S220); the control circuit 130 superimposes the preset capacitor compensation current Icx' of which the phase leads to the preset output current to on the preset output current to during the operation of the inverting circuit 110, so as to control the inverting circuit 110 to adjust the AC output current Io' (step S230); and the adjusted AC output current Io' is provided to a back-end power grid (step S240).

Figure 5:
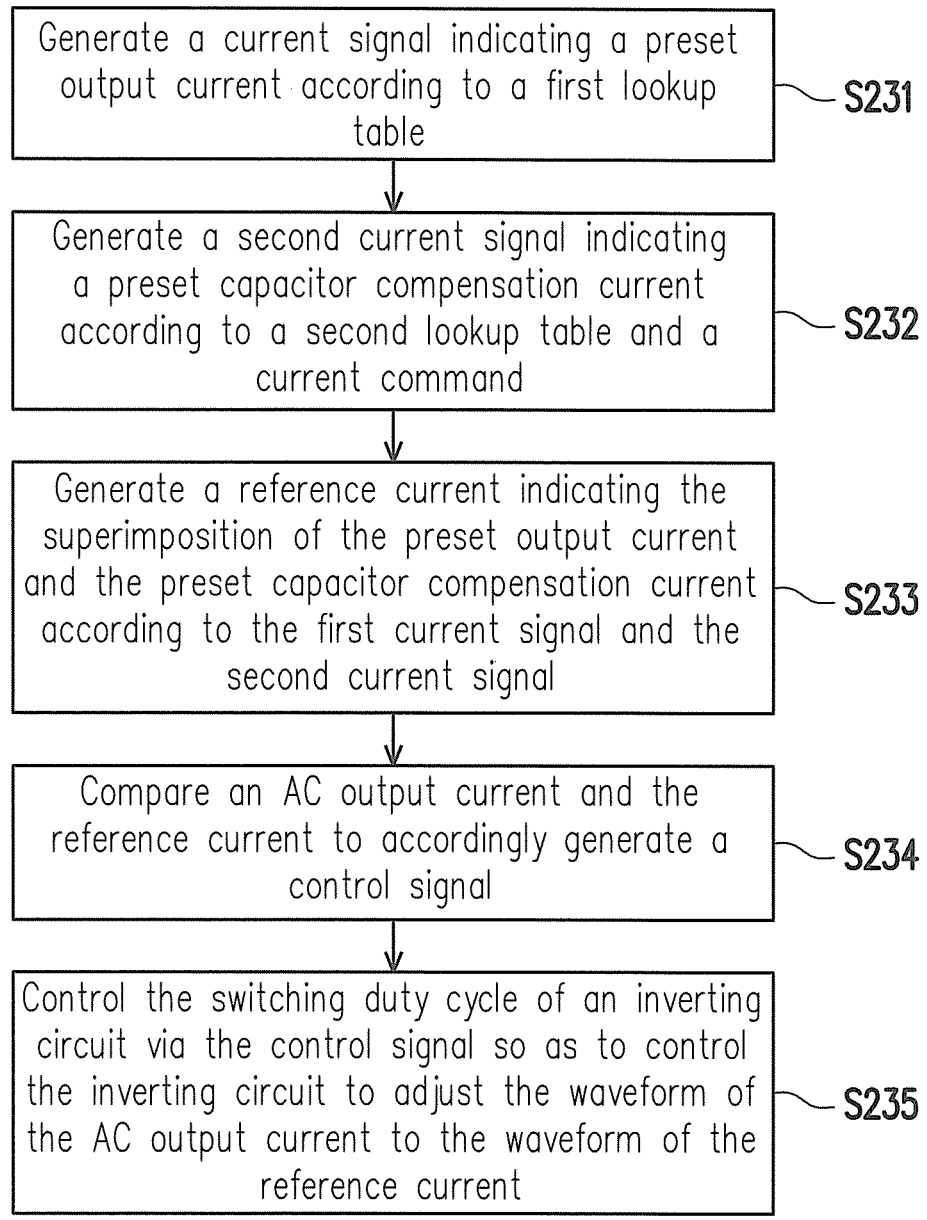
FIG. 5 is a flowchart of a control method of an inverting apparatus of another embodiment of the invention.

More specifically, referring to FIG. 5 (FIG. 5 is a flow chart of a control method of an inverting apparatus of another embodiment of the invention), in the action of the present embodiment in which the inverting circuit 110 is controlled to adjust the AC output current Io' (step S230), the process of the specific control steps thereof are as follows: a current signal Si1 indicating the preset output current Io is generated according to a first lookup table (such as LT1); a second current signal Si2 indicating the preset capacitor compensation current Icx' is generated according to a second lookup table (such as LT2) and a current command CF (step S232); a reference current IREF indicating the superimposition of the preset output current Io and the preset capacitor compensation current Icx' is generated according to the first current signal Si1 and the second current signal Si2 (step S233); an AC output current Io' and the reference current IREF are compared to accordingly generate a control signal C (step S234); and the switching duty cycle of an inverting circuit (such as 110) is controlled by the control signal C so as to control the inverting circuit to adjust the waveform of the AC output current Io' to the waveform of the reference current IREF (step S235).

In particular, the control methods of the embodiments of FIG. 4 and FIG. 5 can obtain sufficient support and teaching according to the descriptions of FIG. 1 to FIG. 3, and therefore similar or repeating contents are not repeated herein.

Based on the above, the embodiments of the invention provide an inverting apparatus and a control method thereof. The inverting apparatus can provide an AC output current containing a preset output current component and a preset capacitor compensation current component to a back-end power grid, wherein the preset capacitor compensation current can be configured to compensate the imaginary current of a safety capacitor, such that the AC output current actually received by the power grid can be substantially equivalent to the preset output current, thus increasing the power factor of the inverting circuit.

Lastly, it should be mentioned that: each of the above embodiments is only configured to describe the technical solutions of the invention and is not intended to limit the invention; and although the invention is described in detail via each of the above embodiments, those having ordinary skill in the art should understand that: modifications can still be made to the technical solutions recited in each of the above embodiments, or portions or all of the technical features thereof can be replaced to achieve the same or similar results; the modifications or replacements do not make the nature of corresponding technical solutions depart from the scope of the technical solutions of each of the embodiments of the invention.

What is claimed is:
1. An inverting apparatus, comprising:
an inverting circuit receiving a DC input power and configured to convert the DC input power into an AC output power, wherein an AC output current of the AC output power is preset to a preset output current;
a capacitor connected to an output terminal of the inverting circuit; and
a control circuit coupled to the inverting circuit and configured to control a power conversion of the inverting circuit, wherein the control circuit superimposes a preset capacitor compensation current of which a phase leads to the preset output current on the preset output current for controlling the inverting circuit to adjust the AC output current and providing the adjusted AC output current to a power grid,
wherein the phase and the amplitude of the preset capacitor compensation current are corresponding to an imaginary current flowing through the capacitor,
wherein the phase of the preset capacitor compensation current substantially leads to the preset output current by 90 degrees, and substantially has the same amplitude as a current flowing through the capacitor.

2. The inverting apparatus of claim 1, wherein the preset capacitor compensation current is decided according to an operating frequency of the inverting circuit and a capacitance value of the capacitor.

3. The inverting apparatus of claim 1, wherein the AC output current received by the power grid is substantially equal to the preset output current.

4. The inverting apparatus of claim 1, wherein the control circuit comprises:
- a first signal generator configured to store a first lookup table corresponding to a phase characteristic of the preset output current, and generate a first current signal indicating the preset output current according to the first lookup table;
- a second signal generator configured to store a second lookup table corresponding to a phase characteristic of the preset capacitor compensation current and a current command indicating an amplitude intensity of the preset capacitor compensation current, and generate a second current signal indicating the preset capacitor compensation current according to the second lookup table and the current command;
- an adder receiving the first current signal and the second current signal to generate a reference current indicating a superimposition of the preset output current and the preset capacitor compensation current; and
- a controller coupled to the adder and the inverting circuit and sampling the AC output current, wherein the controller compares the AC output current and the reference current to generate a corresponding control signal to control a switching duty cycle of the inverting circuit so as to adjust a waveform of the AC output current to a waveform of the reference current.

5. A control method of an inverting apparatus, wherein the inverting apparatus comprises an inverting circuit, a capacitor, and a control circuit, the control method comprising:
- receiving a DC input power;
- converting the DC input power into an AC output power, wherein an AC output current of the AC output power is preset to a preset output current;
- superimposing the preset capacitor compensation current of which a phase leads to the preset output current on the preset output current by the control circuit for controlling the inverting circuit to adjust the AC output current; and
- providing the adjusted AC output current to a power grid, wherein the phase and the amplitude of the preset capacitor compensation current are corresponding to an imaginary current flowing through the capacitor,
wherein a phase of the preset capacitor compensation current substantially leads to the preset output current by 90 degrees, and substantially has the same amplitude as a current flowing through the capacitor.

6. The method of claim 5, wherein the preset capacitor compensation current is decided according to an operating frequency of the inverting circuit and a capacitance value of the capacitor.

7. The method of claim 5, wherein the AC output current received by the power grid is substantially equal to the preset output current.

8. The method of claim 5, wherein the step of superimposing the preset capacitor compensation current of which the phase leads to the preset output current on the preset output current by the control circuit so as to control the inverting circuit to adjust the AC output current comprises:
- generating a first current signal indicating the preset output current according to a first lookup table, wherein the first lookup table indicates a phase characteristic of the preset output current;
- generating a second current signal indicating the preset capacitor compensation current according to a second lookup table and a current command, wherein the second lookup table indicates a phase characteristic of the preset capacitor compensation current and the current command indicates an amplitude intensity of the preset capacitor compensation current; and
- generating a reference current indicating a superimposition of the preset output current and the preset capacitor compensation current according to the first current signal and the second current signal.

9. The method of claim 8, wherein the step of superimposing the preset capacitor compensation current of which the phase leads to the preset output current on the preset output current by the control circuit so as to control the inverting circuit to adjust the AC output current further comprises:
- comparing the AC output current and the reference current to accordingly generate a control signal according to the reference current; and
- controlling a switching duty cycle of the inverting circuit by the control signal so as to control the inverting circuit to adjust a waveform of the AC output current to a waveform of the reference current.

* * * * *